Dec. 12, 1950 M. W. HANKS ET AL 2,533,794
VAPORIZER

Filed Oct. 18, 1947 2 Sheets-Sheet 1

INVENTORS.
Marshall W. Hanks,
BY Arne B. Johnson,
Smith, Olsen & Baird,
Atty's

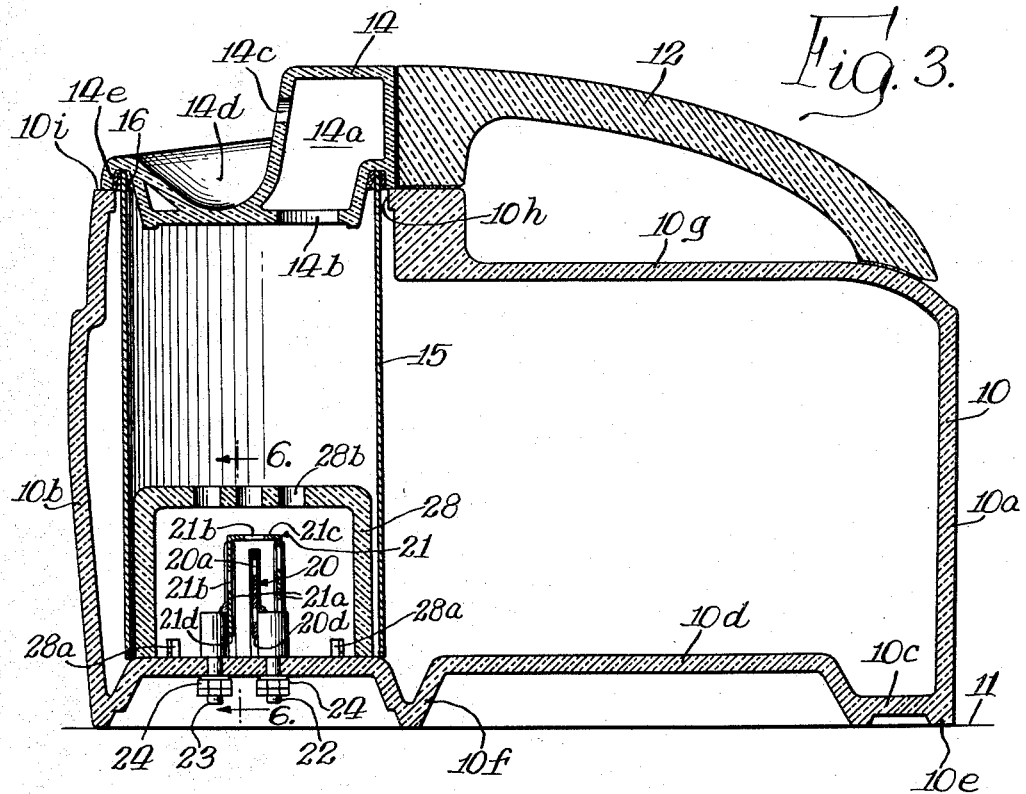
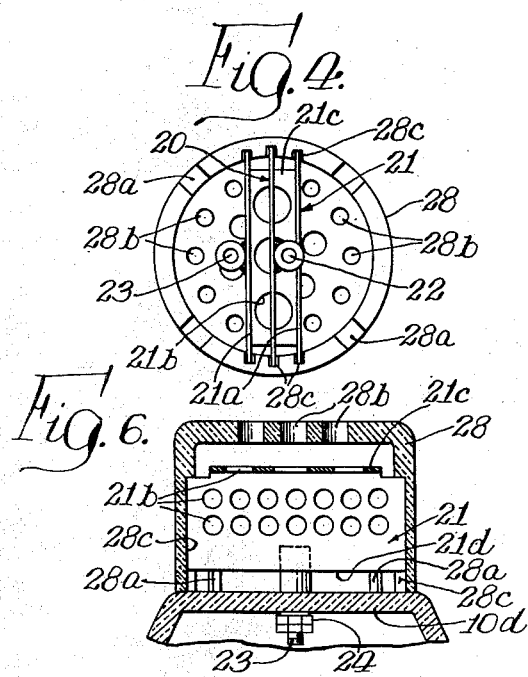
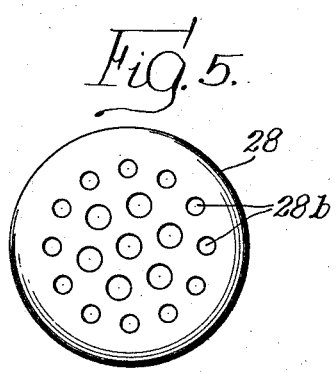

Patented Dec. 12, 1950

2,533,794

UNITED STATES PATENT OFFICE 2,533,794

VAPORIZER

Marshall W. Hanks and Arne B. Johnson, Madison, Wis., assignors to Hankscraft Company, Madison, Wis., a corporation of Wisconsin Application October 18, 1947, Serial No. 780,720

9 Claims. (Cl. 219—40)

This invention relates to improvements in vaporizers of the type in which water or some other liquid is heated and vaporized by electrically operated means. The heating of the liquid is preferably effected by the passage of the electric current through the liquid between spaced electrodes, whereby the device has a definite period of operation determined by the time required to vaporize the liquid contained therein.

It is desirable to embody in a vaporizer of this type a receptacle for a medicament which will also be vaporized and its vapor mingled with the steam or vapor of the liquid. Whether the device be employed to produce steam alone or a mixture of steam and the vapor of a medicament, it is important to be able to start the production of steam or both steam and vapor quickly and also to continue the production for a long period without the necessity of replenishing frequently the supply of water or other liquid in the device.

The principal object of the present invention is to provide a vaporizer having a supply vessel adapted to contain a large quantity of liquid in combination with improved means for quickly heating and vaporizing successive increments of said liquid without the necessity of heating to a vaporizing temperature the entire quantity of liquid in the vessel. More particularly, it is an object of the present invention to provide a vaporizer comprising a vessel adapted to contain a substantial quantity of liquid in combination with a relatively small tube extending into the vessel to segregate a small quantity of the liquid which passes into the tube from the supply in the vessel, and electric heating means fixed on a wall of the vessel and extending into the tube to heat the small quantity of liquid therein. Still another object of the invention is to provide a vessel adapted to contain a large quantity of liquid and having an opening in its top wall normally closed by a removable cover provided with a port discharging over a receptacle for medicament formed therein and also with a depending open ended tube arranged to extend downwardly into the liquid and to surround at and near its lower end an electric heating device mounted on the lower wall of the vessel. A further object is to provide a vaporizer comprising a liquid containing vessel provided with a top opening in which is mounted a removable depending tube extending into the liquid and open at its lower end to receive and surround spaced electrodes which are mounted on the lower wall of the vessel and enclosed by a perforated insulating cap located within the tube. Other objects relate to various features of construction and arrangement which will appear more fully hereinafter.

The nature of the invention will be understood from the following specification taken with the accompanying drawings in which one embodiment is illustrated. In the drawings, Figure 1 shows a top plan view of the improved vaporizer;

Fig. 3 shows a longitudinal vertical section taken on the line 3—3 of Fig. 1;

Fig. 4 shows a bottom plan view of the heating unit which is mounted on the bottom wall of the vessel shown in Fig. 3;

Fig. 5 shows a top plan view of the insulating cap of the heating unit shown in Figs. 3 and 4; and Fig. 6 shows a vertical section taken on the line 6—6 of Fig. 3.

Figure 1:
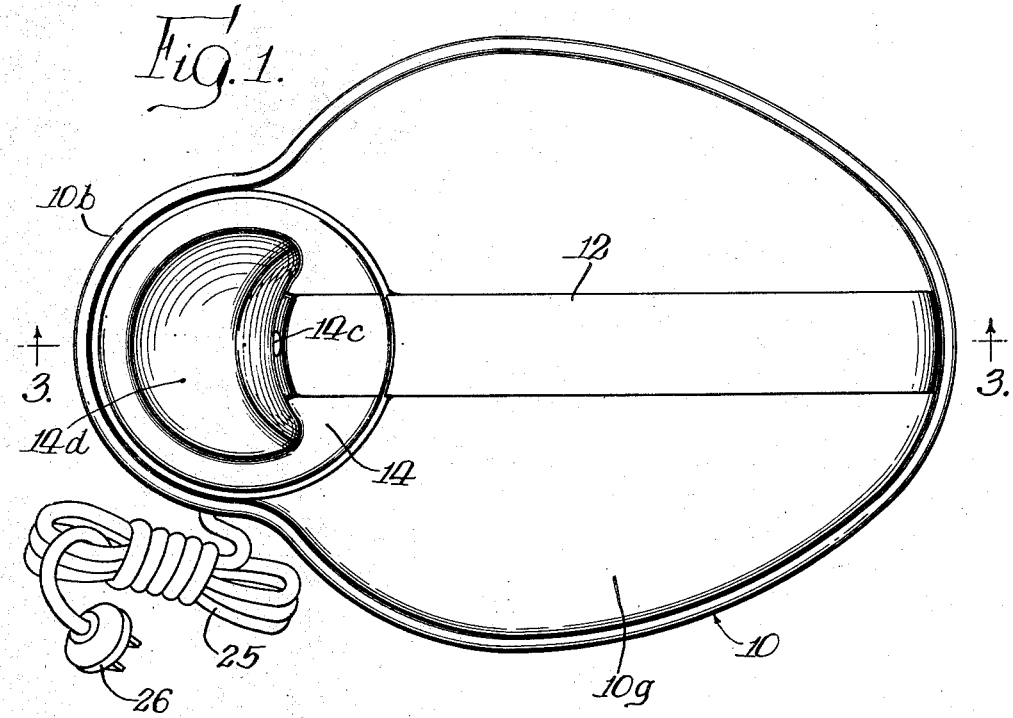
Figure 2:
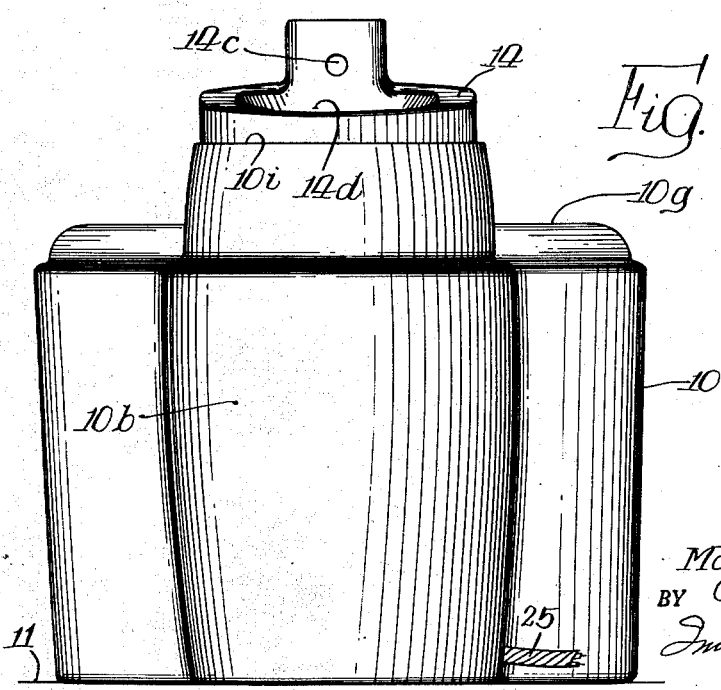
Fig. 2 shows an end elevation of the vaporizer looking toward the right as viewed in Fig. 1.

As illustrated in the drawings, the invention comprises a relatively large vessel 10 formed of porcelain or other suitable heat insulating and electrical insulating material, which is adapted to contain a relatively large quantity of water or other liquid to be vaporized. This vessel comprises an annular wall 10a which is somewhat egg-shaped in its general contour with the provision of an auxiliary bulge 10b at one end. This annular wall is integrally united with a bottom wall 10c which has portions thereof elevated as shown at 10d, thus providing an outer rib 10e adapted to rest upon a table 11 or other support and also a curved rib 10f which is united with the rib 10d at one end of the vessel to form a recess beneath the heating unit of the device. The vessel 10 also comprises a top wall 10g having formed therein at one end of the vessel within the bulge 10b of the annular wall, an opening 10h of circular form. A handle 12 is cemented or otherwise secured to the vessel 10 to permit it to be conveniently carried about and it is the intention that the vessel 10 be of sufficient size to contain a substantial quantity of water, for example, a gallon or so.

The opening 10h is adapted to be normally closed by a removable cover 14 formed preferably of porcelain or other non-metallic material such as that used in the formation of the vessel 10. This cover 14 may rest upon the annular shoulder 10i which is formed around the opening 10h and it is of irregular formation comprising a part which extends upwardly adjacent to the end of the handle 12 and which has formed therein a hollow vapor chamber 14a communicating with the space below through an opening 14b. This chamber 14a has an outlet 14c which is preferably directed horizontally and which is adapted to discharge steam over a hollow receptacle or recess 14d which is formed in the upper side of the cover 14.

The cover 14 has secured thereto a depending tube 15 which is preferably formed of non-metallic material although it may be formed of metallic material in the event that the cover 14 is formed of insulating material, thereby preventing danger of electric shock. This tube is secured in an annular recess 14e in the underside of the cover by means of cement 16 or the like. This cover extends downwardly and is preferably of such length that its lower end rests on the top surface of the lower wall 10d of the vessel 10, with an imperfect contact so that water or other liquid from the vessel 10 may enter the interior of the tube under the lower end thereof around the heating unit which is loosely engaged by the lower portion of the tube. In the event that the tube 15 is too short to rest on the bottom wall 10d the tube will be supported by the cover 14 which then rests on the shoulder 10i. In either case, the cover and the tube may be freely rotated to direct the jet of steam from the port 14c in any direction. Upon removal of the cover and the tube the vessel 10 may be filled readily with liquid without disturbing the electrodes.

The heating unit comprises a pair of spaced electrodes 20 and 21 which are secured to terminal posts 22 and 23, respectively, mounted in the bottom wall 10d of the vessel and having lowered threaded extremities which are adapted to be secured by nuts 24 to the supply conductors which are embodied in the usual flexible cord 25 having a terminal plug 26 at its end for plugging into an outlet opening of the usual electric lighting circuit. The electrode 20 is in the form of a flat vertical plate provided with a series of openings 20a therein and the electrode 21 is in the form of a channel shaped member comprising a pair of plates 21a located on opposite sides of the electrode 20 and having apertures 21b formed therein. These side plates of the electrode 21a are connected by a top transverse member 21c having other apertures 21b formed therein. When these electrodes are connected in an electric circuit through the flexible cord 25, an electric current passes between the electrodes 20 and 21 through the small quantity of liquid located between them, thereby heating this liquid to the point of vaporization.

In order to protect the user of this device from electric shock by contact with the electrodes when the cover 14 and the tube 15 are removed from the vessel, the electrodes are covered by an inverted cup-shaped cap member 28 which is formed of porcelain or other suitable heat insulating and electrical insulating material such as that of which the vessel 10 is formed. This cap member 28 is slightly smaller in diameter than the tube 15 so that the tube will fit freely over it as shown in Fig. 3 with an annular space between the two members. The outer wall of the cap member is provided with a series of openings 28a adjacent the bottom wall to permit liquid to enter the interior of the cap member around the electrodes and the top wall of the cap member 28 is provided with a plurality of openings 28b which permit the free escape of bubbles of vapor upwardly from the region of the electrodes.

The cap member 28 and the electrodes 20 and 21 are preferably assembled as a unit to facilitate their insertion into and withdrawal from the vessel 10, and, for this purpose, the annular outer wall of the member 28 is provided on opposite sides with parallel grooves 28c which are frictionally engaged by the ends of the plates 20 and 21a of the electrodes with a sufficiently tight fit to hold the electrodes and the cap member in assembled relationship. The terminal posts are attached to the electrodes and when this assembled unit is installed in the vessel 10 it is held in place by the nuts 24 which may be readily removed when the unit is to be withdrawn for any purpose.

The lower edges 20d and 21d of the electrodes are preferably spaced upwardly from the bottom 10d of the vessel a substantial distance, for example, one-half inch or so, to provide a hot water sump within the cap member and below the electrodes which is adapted to maintain a more uniform and steady flow of steam from the electrodes and a steady steam jet. If the lower edges of the electrodes were in close proximity to the bottom wall, the cold water coming in from outside the tube into immediate contact with the electrodes tends to cause a momentary recession of steam and a resulting surge of cold water to and from the tube which momentarily impedes the generation of steam. This difficulty is overcome by the foregoing construction. Also, by keeping the electrodes spaced from the bottom wall, the occurrence of a direct short circuit through accumulated sludge is prevented.

With the arrangement described above, it will be apparent that water or other liquid may enter the interior of the tube 15 through the space beneath the open lower end thereof and that this water, finding its way into the interior of the cap member 28, is heated and vaporized by the passage of current therethrough between the electrodes 20 and 21, with the result that the bubbles of steam or vapor rise upwardly through the relatively small quantity of water in the tube 15 and through the opening 14b into the vapor chamber 14a from which chamber the vapor or steam is discharged outwardly through the port 14c over the medicament contained in the recess 14d, thereby vaporizing the medicament and causing the mixture of the vapor of the liquid and of the medicament to reach the user. Of course, the device may be used merely for producing a vapor of the liquid contained in the vessel 10 without placing any medicament in the recess 14d. In this way it is possible to vaporize quickly successive increments of liquid which find their way into the interior of the cap member 28 around the lower end of the tube 15 without the necessity of heating the entire body of liquid in the vessel 10. The device may thus be continued in operation for a long period of time while having the advantage that it may be caused to produce a vapor quickly when started in operation.

Although one form of the invention has been shown and described by way of illustration, it will be understood that it may be constructed in various other embodiments which come within the scope of the appended claims.

We claim:

1. A vaporizer comprising a vessel adapted to contain a quantity of liquid, said vessel having an opening, a tube extending downwardly from said opening and having an open end located adjacent the bottom of said vessel, spaced electrodes mounted on the bottom wall of said vessel and extending upwardly into said tube, and an insulating cup-shaped cap mounted in inverted position over said electrodes within said tube.

2. A vaporizer comprising a vessel adapted to contain a quantity of liquid, said vessel having an opening, a tube extending downwardly from said opening and having an open end located adjacent the bottom of said vessel, spaced electrodes mounted on the bottom wall of said vessel and extending upwardly into said tube, and an insulating cap mounted over said electrodes within said tube, said cap having perforations therein and being spaced from said tube.

3. A vaporizer comprising a vessel adapted to contain a quantity of liquid, said vessel having an opening, a tube extending downwardly from said opening and having an open end located adjacent the bottom of said vessel, spaced electrodes mounted on the bottom wall of said vessel and extending upwardly into said tube, and an insulating cap mounted over said electrodes within said tube, said cap being secured to said bottom wall and having openings therein adjacent said bottom wall and in its upper part.

4. A vaporizer comprising a vessel adapted to contain a quantity of liquid and having an opening in its wall, a tube extending downwardly from said opening and having an open end located adjacent the bottom of said vessel, and a pair of vertical spaced plate electrodes mounted on the bottom wall of said vessel and extending upwardly into said tube, said electrodes being perforated, and an inverted cup-shaped insulating cap member mounted over said electrodes within said tube.

5. A vaporizer comprising a vessel of insulating material having a top wall provided with an opening, a cover for closing said opening, a nonmetallic tube attached to said cover and extending downwardly into said liquid, said tube having an open end located adjacent the bottom of said vessel, and a pair of spaced electrodes mounted on the bottom wall of said vessel within said tube, one of said electrodes being in the form of a flat vertical plate and the other electrode being in the form of a channel shaped member inverted over and spaced from said plate.

6. A vaporizer comprising a vessel of insulating material having a top wall provided with an opening, a cover for closing said opening, a nonmetallic tube attached to said cover and extending downwardly into said liquid, said tube having an open end located adjacent the bottom of said vessel, a pair of spaced electrodes mounted on the bottom wall of said vessel within said tube, one of said electrodes being in the form of a flat vertical plate and the other electrode being in the form of a channel shaped member inverted over and spaced from said plate, and an inverted cup-shaped insulating cap member mounted over said electrodes and secured to said bottom wall.

7. A vaporizer comprising a vessel adapted to contain a quantity of liquid, said vessel having an opening, a tube extending downwardly from said opening and having an open end located adjacent the bottom of said vessel, spaced electrodes mounted on the bottom wall of said vessel and extending upwardly into said tube, said electrodes being spaced upwardly from the bottom of said vessel, and an insulating cap mounted over said electrodes within said tube, said cap having perforations therein and being spaced from said tube.

8. A vaporizer comprising a vessel adapted to contain a quantity of liquid, said vessel having an opening, a tube extending downwardly from said opening and having an open end located adjacent the bottom of said vessel, an inverted cup-shaped cap member located within the lower end of said tube, spaced electrodes located within and secured to said cap member, terminal posts attached to said electrodes and extending through the bottom wall of said vessel, and means engaging said terminal posts for securing said electrodes and said cap member to said vessel.

9. A vaporizer comprising a vessel adapted to contain a quantity of liquid, said vessel having an opening, a tube extending downwardly from said opening and having an open end located adjacent the bottom of said vessel, a heating device mounted on the bottom wall of said vessel and extending upwardly into said tube, and an insulating cap mounted over said heating device within said tube, said cap having perforations therein and being spaced from said tube.

MARSHALL W. HANKS.
ARNE B. JOHNSON.

REFERENCES CITED

The following references are of record in the file of this patent:

UNITED STATES PATENTS

| Number | Name | Date |
|---|---|---|
| 1,483,280 | Cherry | Feb. 12, 1924 |
| 1,940,775 | Smith | Dec. 26, 1933 |
| 1,949,778 | Brown et al. | Mar. 6, 1934 |
| 1,977,232 | Ginder | Oct. 16, 1934 |
| 1,987,381 | Twombly | Jan. 8, 1935 |
| 2,158,681 | Schulte | May 16, 1939 |
| 2,213,851 | Shaw et al. | Sept. 3, 1940 |
| 2,387,156 | Katzman | Oct. 16, 1945 |

FOREIGN PATENTS

| Number | Country | Date |
|---|---|---|
| 241,473 | Great Britain | Oct. 22, 1925 |